United States Patent

Muraoka et al.

[11] 3,829,555
[45] Aug. 13, 1974

[54] METHOD OF MANUFACTURING SILANES

[75] Inventors: Hisashi Muraoka, Yokohama; Masafumi Asano, Kawasaki; Taizo Ohashi, Kanagawa-ken; Yuzo Shimazaki, Yokohama, all of Japan

[73] Assignee: Tokyo Shibaura Electric Co., Ltd., Saiwai-ku, Kawasaki-shi, Japan

[22] Filed: Sept. 26, 1972

[21] Appl. No.: 292,394

[30] Foreign Application Priority Data
Oct. 1, 1971  Japan.............................. 46-76281

[52] U.S. Cl. .............................................. 423/347
[51] Int. Cl. .......................................... G01b 33/04
[58] Field of Search ................................... 423/347

[56]  References Cited
UNITED STATES PATENTS
2,530,367  11/1950  Hance et al......................... 423/347

Primary Examiner—Oscar R. Vertiz
Assistant Examiner—Hoke S. Miller
Attorney, Agent, or Firm—Flynn & Frishauf

[57] ABSTRACT

A method of manufacturing silances expressed by a general formula:

$$Si_nH_{2n+2}$$

(where n is an integer of 1 to 3) by disproportionating alkoxy-silanes expressed by a general formula:

$$H_nSi(OR)_{4-n}$$

(where R is an alkyl group having less than four carbon atoms and n is an integer of 1 to 3) in the presence of alcoholate expressed by a general formula:

$$ROM$$

(where R is an alkyl group having less than four carbon atoms and M is one selected from the group consisting of alkali metals, alkaline earth metals and aluminum).

7 Claims, 2 Drawing Figures

F I G. 1
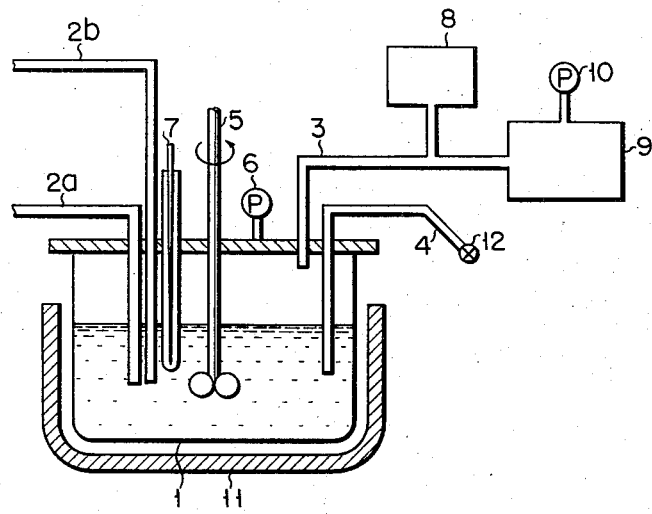
F I G. 2
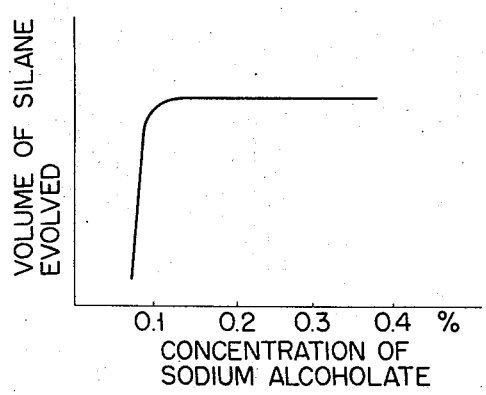

METHOD OF MANUFACTURING SILANES

This invention relates to a method of manufacturing silanes expressed by a general formula:

$$Si_nH_{2n+2}$$

(where n is an integer of 1 to 3).

Silane is indispensable for the semiconductor industry as a raw material of high purity silicon of semiconductor grade. Heretofore, there have been proposed a large number of methods for manufacturing such silane. Silane is a compound, out of which silicon readily crystallizes and quickly decomposes itself into silicon and hydrogen when exposed to a higher temperature than 700°C, as seen from the following formula:

$$SiH_4 = Si + 2H_2 - 7.3 \text{ Kcal/mol}$$

Silicon which crystallizes out of silane at such a relatively low temperature has high purity substantially free from impurities which might otherwise be brought from a reaction vessel itself. Silane, particularly monosilane $SiH_4$ has many prominent advantages that its boiling point is extremely low, as −111.9°C; can be easily separated from impurities; contains a large amount of silicon and consequently requires a relatively small amount of monosilane to be treated per unit amount of silicon being produced; and evolves only hydrogen as a decomposition byproduct, and does not generate other harmful byproducts such as chlorine and hydrogen chloride as in the decomposition of chlorosilane.

Silane-manufacturing processes proposed to date include:

1. Process of decomposing magnesium silicide with dilute hydrochloric acid as shown by the following formula:

$$Mg_2Si + 4HCl \rightarrow SiH_4 + 2MgCl_2$$

This process had the drawbacks that not only monosilane ($SiH_4$) but also other higher silanes were simultaneously grown as $SiH_4$ 40 percent, $Si_2H_6$ 30 percent, $Si_3H_8$ 15 percent and $Si_4H_{10}$ 10 percent, and that the yield of monosilane was as low as 40 percent.

2. Preparation of silane by the reaction of silicon tetrachloride with lithium aluminum hydride in accordance with the following equation:

$$SiCl_4 + LiAlH_4 \rightarrow SiH_4 + LiCl + AlCl_3$$

This method for semiconductor grade silicon has the disadvantage of increasing manufacturing cost.

3. Process of disproportionating triethoxysilane $HSi(OC_2H_5)_3$ with sodium as indicated by the following formula:

$$4HSi(OC_2H_5)_3 \xrightarrow{Na} SiH_4 + 3Si(OC_2H_5)_4$$

This process was also accompanied with the shortcoming that the above-mentioned reaction could not be continued long, because sodium which was an extremely active metal was very quickly deteriorated in action to obstruct the progress of said disproportionation reaction.

The mechanism by which the action of sodium is deteriorated is supposed to originate with the occurrence of the following side reactions:

a. $SiH(OC_2H_5)_3 + 3Na \rightarrow Si + \frac{1}{2}H_2 + 3C_2H_5ONa$ where silicon is produced during the reaction of sodium with triethoxysilane as indicated by the above side reaction formula and said freed silicon precipitates on the surface of the sodium, then the reaction of silane stops.

b. $Si(OC_2H_5)_4 + 2Na \rightarrow C_2H_5Si(OC_2H_5)_3 + Na_2O$ $C_2H_5Si(OC_2H_5)_3 + 2Na \rightarrow (C_2H_5)_2Si(OC_2H_5)_2 + Na_2O$ As seen from these reactions, tetraethoxysilane $Si(OC_2H_5)_4$ derived from the disproportionation of triethoxysilane further reacts with sodium to form inactive sodium oxide $Na_2O$.

The above-mentioned deterioration of sodium can indeed be prevented by activating the surface of the sodium with addition of alcohol as shown by the following formula:

$$C_2H_5OH + Na \rightarrow C_2H_5ONa + \frac{1}{2}H_2$$

As seen from this formula, however, reaction of alcohol with sodium causes the evolution of hydrogen, which undesirably dilutes the silane obtained. Further, triethoxysilane reacts with alcohol to generate tetraethoxysilane, as indicated by the following formula:

$$HSi(OC_2H_5)_3 + C_2H_5OH \rightarrow Si(OC_2H_5)_4 + H_2$$

Since the growth of tetraethoxysilane means loss of raw triethoxysilane, the aforesaid addition of alcohol is not desired.

This invention has been accomplished to eliminate the drawbacks accompanying the aforesaid prior silane-manufacturing processes and is intended to provide a method of manufacturing in good yield silane, particularly high purity monosilane $SiH_4$ used in the semiconductor industry, said method consisting in decomposing alkoxysilanes expressed by a general formula:

$$H_nSi(OR)_{4-n}$$

(where R is an alkyl group having less than four carbon atoms and n is an integer of 1 to 3) into silane expressed by a general formula:

$$Si_nH_{2n+2}$$

(where n is an integer of 1 to 3) in the presence of alcoholate expressed by a general formula:

$$ROM$$

(where R is an alkyl group having less than four carbon atoms and M is one selected from the group consisting of alkali metals, alkaline earth metals and aluminum).

FIG. 1 is a schematic illustration of silanes manufacturing apparatus; and

FIG. 2 is a graph showing the relationship of the concentration of sodium alcoholate in a reaction system and the amount of silane obtained.

The silane-manufacturing method of this invention is characterized in that alcoholate is used to disproportionate alkoxysilanes into silane and tetraalkoxysilane. In this decomposition reaction, alcoholate, for example, sodium ethylate exerts a far more effective action than a catalyst of metallic sodium heretofore used in the decomposition of triethoxysilane. The reason is that sodium ethylate is not deteriorated in action due to occurrence of side reactions, thereby enabling said disproportionation reaction to be continued over a long period without interruption, and in consequence attaining the production of high purity silane in good yield.

Alcoholate is free from the hazardous property of metallic sodium and easy to handle, enabling the repair and maintenance of a reaction apparatus according to the method of this invention to be effected with greater ease than when metallic sodium is used.

For the object of this invention, there is preferably used sodium ethylate from the standpoint of economy and ease of handling. However, the invention admits of application of any other type of alcoholate expressed by the formula ROM where R is an alkyl group having less than four carbon atoms and M is one selected from the group consisting of alkali metals, alkaline earth metals and aluminum. Where M represents potassium, there is observed little difference in the effect of producing desired silane, because potassium has substantially the same reactivity as sodium. Where M denotes any of the alkaline earth metals, said alkaline earth metal does not give rise to any possibility of harmful alkali ions being carried into semiconductor grade silane, though said alkaline earth metal has a slightly lower reactivity than an alkali metal. Therefore, alkaline earth metals are useful in manufacturing silane as the raw material of a semiconductor which should be saved from the inclusion of particularly alkali ions.

The alcoholate (ROM) used in the method of this invention may be provided directly from an alcoholate solution prepared by dissolving a metal (M) in alcohol (ROH). However, there is preferably used a solution obtained by dissolving the alcoholate in tetraalkoxysilane $Si(OR)_4$.

It was experimentally confirmed that where the alcoholate accounted for more than 0.1 percent by weight of a reaction system, silane was continuously formed. FIG. 2 is a graph showing the relationship of the concentration of sodium alcoholate in a reaction system and the amount of silane obtained. As seen from the graph, the sodium alcoholate should have a concentration of more than 0.1 percent by weight.

There will now be explained by reference to FIG. 1 the arrangement of a reaction apparatus used in the later described example of this invention as well as in referential experiments falling outside of the scope of the invention.

A reaction vessel 1 made of pressure glass is fitted with an alkoxysilane inlet pipe 2a, alcoholate inlet pipe 2b, silane outlet pipe 3, byproduct outlet pipe 4, agitator 5, pressure gauge 6 and temperature controlling thermocouple 7. The silane outlet pipe 3 is connected to a gas chromatographic apparatus 8 and a silane collector 9. The silane collector 9 is also fitted with a pressure gauge 10. To the outer walls of the reaction vessel 1 is fitted a heater 11 to maintain the vessel at a desired temperature. The interior of the reaction vessel 1 is made observable from the outside. Numeral 12 is a cock for opening or closing the byproduct outlet pipe 4.

Reaction takes place when alkoxysilanes, for example, triethoxysilane is introduced into the reaction vessel 1 by a flow regulating pump (not shown). Silane $SiH_4$ produced by the reaction is collected into the collector 9 and part of the silane is conducted to the gas chromatographic apparatus 8 to have its composition determined. To find the reaction rate, increased pressure in the reaction vessel 1 or silane collector 9 is continuously recorded by the pressure gauges 6 or 10. Said increased pressure mainly results from the evolution of gases of hydrogen and silane. Tetraethoxysilane $Si(OC_2H_5)_4$ is drawn out of the reaction vessel 1 through the outlet pipe 4 utilizing the pressure within the reaction vessel 1.

REFERENCE 1

The reaction vessel 1 was charged with 60g of metallic sodium as a catalyst and triethoxysilane was introduced into the vessel 1 continuously at the rate of 3$l$/hr. Initially the surface of the metallic sodium retained a metallic luster. The gas evolved as the result of the progress of reaction was ignited when released into the air, showing that silane gas was continuously formed in the reaction vessel 1. 3 to 5 hours later, however, the sodium surface was blackened. At this time, there was no longer observed any increased pressure in the reaction vessel 1 nor any growth of silane gas. This fact showed that the metallic sodium fully lost its catalytic action.

REFERENCE 2

Metallic sodium obstructs the progress of reaction due to its deterioration as observed in Reference 1. Therefore before the metallic sodium fully lost its catalytic action, an attempt was made to reactivate its surface by introducing alcohol into the reaction vessel 1 as shown by the following reaction formula:

$$C_2H_5OH + Na \rightarrow C_2H_5ONa + \frac{1}{2}H_2$$

Though, in this case, the sodium surface preserved a metallic luster and there was also observed the evolution of silane gas, yet the yield of silane sharply decreased to 10 to 30 percent.

The reason is that reaction of the sodium with alcohol caused the generation of hydrogen and further reaction of triethoxysilane with alcohol led, as indicated by the following formula, to the growth of tetraethoxysilane and hydrogen, thus losing raw triethoxysilane.

$$HSi(OC_2H_5)_3 + C_2H_5OH \rightarrow Si(OC_2H_5)_4 + H_2$$

EXAMPLE

Into the reaction vessel 1 was introduced triethoxysilane at the rate of 20 $l$/hr through the alkoxysilane inlet pipe 2a. On the other hand, there was prepared a catalyst solution by dissolving sodium ethylate $C_2H_5ONa$ in tetraethoxysilane $Si(OC_2H_5)_4$. This catalyst solution was introduced at the rate of 1 l/hr into the reaction vessel 1 through the alcoholate inlet pipe 2b. Then it was confirmed that pressure in the reaction vessel 1 progressively increased and silane ($SiH_4$) was continuously formed; the yield of silane accounted for 70 to 90 percent of the theoretical value; and the disproportionation reaction proceeded quite quickly. It was also found that stirring of the charged mass by the agitator 5 was not so effective as expected to accelerate said disproportionation reaction. The disproportionation reaction taking place in this example may be expressed by the following formula:

$$\underset{\text{Liquid}}{4HSi(OC_2H_5)_3} \longrightarrow \underset{\text{Gas}}{SiH_4} + \underset{\text{Liquid}}{3Si(OC_2H_5)_4}$$

As seen from the above reaction formula, triethoxysilane and tetraethoxysilane are liquids, whereas silane is gas. With the progress of reaction, the reaction vessel 1 was progressively filled with silane gas and liquid tetraethoxysilane obtained as a byproduct. It was therefore necessary to discharge these reaction product and byproduct from the reaction vessel 1 continuously or periodically. At this time, part of the catalyst of sodium ethylate was unavoidably drawn off, so that the catalyst had to be replenished also continuously or periodically.

What we claim is:

1. In the method of manufacturing silanes of the formula $$Si_nH_{2n+2}$$

wherein n is an integer of 1 to 3 which comprises disproportionating alkoxy silanes of the formula $$H_nSi(OR)_{4-n}$$

wherein R is an alkyl group having less than four carbon atoms and n is an integer of 1 to 3, in the presence of alcoholate of the formula $$ROM$$

and wheren M is one selected from the group consisting of alkali metals, alkaline earth metals and aluminum, the improvement comprising introducing said alcoholate in more than 0.1 percent by weight of the reaction system into the presence of said alkoxy silane in the form of a solution of said alcoholate in a tetraalkoxysilane of the formula $$Si(OR)_4.$$

2. The method according to claim 1 wherein the letter n indicated in the chemical formula $H_nSi(OR)_{4-n}$ is 1.

3. The method according to claim 1 wherein $H_nSi(OR)_{4-n}$ is triethoxysilane.

4. The method according to claim 1 wherein M is an alkali metal.

5. The method according to claim 4 wherein ROM is sodium ethylate.

6. The method according to claim 1 wherein the tetraalkoxysilane is tetraethoxysilane.

7. The method according to claim 5 wherein $H_nSi(OR)_{4-n}$ is triethoxysilane, and $Si(OR)_4$ is tetraethoxysilane.

* * * * *